United States Patent
Hines

(10) Patent No.: US 10,838,988 B2
(45) Date of Patent: *Nov. 17, 2020

(54) SYSTEM AND METHOD FOR EFFICIENT GEOSPATIAL INDEXING

(71) Applicant: GOOGLE LLC, Mountain View, CA (US)

(72) Inventor: Steven Keith Hines, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/993,185

(22) Filed: May 30, 2018

(65) Prior Publication Data

US 2018/0276242 A1    Sep. 27, 2018

Related U.S. Application Data

(63) Continuation of application No. 14/932,053, filed on Nov. 4, 2015, now Pat. No. 10,007,677.

(Continued)

(51) Int. Cl.
  *G06F 16/29*    (2019.01)
  *G06F 16/248*   (2019.01)

(52) U.S. Cl.
  CPC .......... *G06F 16/29* (2019.01); *G06F 16/248* (2019.01)

(58) Field of Classification Search
  CPC .......... G06F 17/30241; G06F 17/3087; G06F 16/29; G06F 16/248; G06T 2210/36;

(Continued)

(56) References Cited

U.S. PATENT DOCUMENTS 5,519,809 A    5/1996  Husseiny et al.
5,864,632 A    1/1999  Ogawa et al.
(Continued)

FOREIGN PATENT DOCUMENTS

EP    2 078 926 A1    7/2009
EP    2 290 322 A1    3/2011

OTHER PUBLICATIONS

"Zillow Real Estate and Rental Data," Web page <https://www.zillow.com/research/data>, 4 pages, Jul. 9, 2014, retrieved from Internet Archive Wayback Machine <https://web.archive.org/web/20140709214731/https://www.zillow.com/research/data/> on Jul. 9, 2014) (Year: 2014).*

(Continued)

*Primary Examiner* — Jesse P Frumkin
(74) *Attorney, Agent, or Firm* — Marshall, Gerstein & Borun LLP

(57) ABSTRACT

A geospatial indexing module operating in a server device operates on an efficient index for retrieving and providing map features which represent geographic entities such as streets, roads, cities, states, buildings, bodies of water, etc. The index includes identification information for a map feature fragment, which represents at least a portion of a map feature, as well as a node in a tree data structure to which the map feature fragment corresponds and a range of levels of detail for which the map feature fragment is valid. When a user requests map data for a geographic region at a level of detail, the geospatial indexing module queries the index for all map feature fragments within the requested region and level of detail and provides the retrieved map feature fragments to the user.

20 Claims, 7 Drawing Sheets

Feature fragmentation and simplification

Related U.S. Application Data

(60) Provisional application No. 62/087,320, filed on Dec. 4, 2014.

(58) Field of Classification Search
CPC .... G06Q 50/16; G06Q 50/163; G06Q 50/165; G01C 21/32; G01C 21/367; G06C 21/367
See application file for complete search history.

(56) References Cited

U.S. PATENT DOCUMENTS

| | | | |
|---|---|---|---|
| 5,884,320 A | 3/1999 | Agrawal et al. | |
| 5,966,135 A | 10/1999 | Roy et al. | |
| 6,014,614 A | 1/2000 | Herring et al. | |
| 6,308,177 B1 | 10/2001 | Israni et al. | |
| 6,314,370 B1 | 11/2001 | Curtright | |
| 6,388,684 B1 | 5/2002 | Iwamura et al. | |
| 6,507,850 B1 | 1/2003 | Livshutz et al. | |
| 6,577,714 B1 | 6/2003 | Darcie et al. | |
| 6,601,073 B1 | 7/2003 | Robare | |
| 6,745,198 B1 | 6/2004 | Luo et al. | |
| 7,035,869 B2 | 4/2006 | Smartt | |
| 7,142,217 B2 | 11/2006 | Howard et al. | |
| 7,308,117 B2 | 12/2007 | Chitradon et al. | |
| 7,551,182 B2 | 6/2009 | Bethune et al. | |
| 7,689,621 B1 | 3/2010 | Huber et al. | |
| 7,734,412 B2 | 6/2010 | Shi et al. | |
| 7,844,417 B2 | 11/2010 | Du | |
| 7,865,301 B2 | 1/2011 | Rasmussen et al. | |
| 7,933,897 B2 | 4/2011 | Jones et al. | |
| 7,945,546 B2 | 5/2011 | Bliss et al. | |
| 8,010,407 B1 | 8/2011 | Santoro et al. | |
| 8,014,946 B2 | 9/2011 | Rasmussen et al. | |
| 8,041,506 B2 | 10/2011 | Bliss et al. | |
| 8,095,434 B1 * | 1/2012 | Puttick | G06F 16/29 705/26.9 |
| 8,223,172 B1 | 7/2012 | Miller et al. | |
| 8,244,743 B2 | 8/2012 | Gonzalez et al. | |
| 8,335,783 B2 | 12/2012 | Milby | |
| 8,386,468 B2 | 2/2013 | Hu et al. | |
| 8,799,799 B1 | 8/2014 | Cervelli et al. | |
| 8,928,691 B2 | 1/2015 | Maurer et al. | |
| 10,754,884 B1 * | 8/2020 | Daimler | G06F 16/335 |
| 2002/0113797 A1 | 8/2002 | Potter et al. | |
| 2003/0229441 A1 | 12/2003 | Pechatnikov et al. | |
| 2004/0139080 A1 | 7/2004 | Schmidt et al. | |
| 2004/0217980 A1 | 11/2004 | Radburn et al. | |
| 2005/0285876 A1 | 12/2005 | Balaga et al. | |
| 2006/0041375 A1 | 2/2006 | Witmer et al. | |
| 2006/0074547 A1 | 4/2006 | Kaufman et al. | |
| 2006/0074660 A1 | 4/2006 | Waters et al. | |
| 2006/0139375 A1 | 6/2006 | Rasmussen et al. | |
| 2006/0170693 A1 | 8/2006 | Bethune et al. | |
| 2006/0265197 A1 | 11/2006 | Peterson | |
| 2006/0271281 A1 | 11/2006 | Ahn et al. | |
| 2006/0293847 A1 | 12/2006 | Marriott et al. | |
| 2007/0016651 A1 | 1/2007 | Blagsvedt et al. | |
| 2007/0021908 A1 | 1/2007 | Jaugilas et al. | |
| 2007/0050340 A1 | 3/2007 | von Kaenel et al. | |
| 2007/0098211 A1 | 5/2007 | Walton et al. | |
| 2007/0118520 A1 | 5/2007 | Bliss et al. | |
| 2007/0176796 A1 | 8/2007 | Bliss et al. | |
| 2007/0208498 A1 | 9/2007 | Barker et al. | |
| 2007/0210937 A1 | 9/2007 | Smith et al. | |
| 2007/0226314 A1 | 9/2007 | Eick et al. | |
| 2007/0245238 A1 | 10/2007 | Fugitt et al. | |
| 2008/0016472 A1 | 1/2008 | Rohlf et al. | |
| 2008/0109159 A1 | 5/2008 | Shi et al. | |
| 2008/0183730 A1 | 7/2008 | Enga | |
| 2008/0238941 A1 | 10/2008 | Kinnan et al. | |
| 2009/0089149 A1 | 4/2009 | Lerner et al. | |
| 2009/0113296 A1 | 4/2009 | Lacy et al. | |
| 2009/0198767 A1 | 8/2009 | Jakobson et al. | |
| 2009/0271718 A1 | 10/2009 | Balaishis et al. | |
| 2010/0073391 A1 | 3/2010 | Horowitz et al. | |
| 2010/0082564 A1 | 4/2010 | Fernekes | |
| 2010/0114941 A1 | 5/2010 | von Kaenel et al. | |
| 2010/0118025 A1 | 5/2010 | Smith et al. | |
| 2010/0194784 A1 | 8/2010 | Hoff et al. | |
| 2010/0201707 A1 | 8/2010 | Rasmussen et al. | |
| 2010/0287207 A1 | 11/2010 | Motoyama | |
| 2010/0321399 A1 | 12/2010 | Ellren et al. | |
| 2011/0004830 A1 | 1/2011 | Von Kaenel et al. | |
| 2011/0096458 A1 | 4/2011 | Haskins | |
| 2011/0153186 A1 | 6/2011 | Jakobson | |
| 2011/0172909 A1 | 7/2011 | Kahn et al. | |
| 2011/0177845 A1 | 7/2011 | Fasold | |
| 2011/0191014 A1 | 8/2011 | Feng et al. | |
| 2011/0208724 A1 | 8/2011 | Jones et al. | |
| 2011/0267369 A1 | 11/2011 | Olsen | |
| 2011/0306304 A1 | 12/2011 | Forutanpour et al. | |
| 2012/0110513 A1 | 5/2012 | Gaertner et al. | |
| 2013/0076784 A1 | 3/2013 | Maurer et al. | |
| 2013/0246443 A1 | 9/2013 | Laurenzo et al. | |
| 2014/0108419 A1 | 4/2014 | Udeshi et al. | |
| 2014/0257687 A1 | 9/2014 | Chen et al. | |
| 2015/0113379 A1 | 4/2015 | Wakefield et al. | |
| 2015/0254276 A1 | 9/2015 | Oliver et al. | |
| 2015/0293971 A1 | 10/2015 | Will et al. | |

OTHER PUBLICATIONS

Bing Maps AJAX Control, Version 7.0 (2011).
Bing Services, "Getting Started with V4 of the API (Part 1)," Microsoft (2011). Retrieved from the Internet on Sep. 26, 2011: <URL:http://msdn.microsoft.com/en-us/library/aa907678.aspx>.
Bo et al., "Progressive Transmission of Vector Map on the Web," XXIST Congress of the International Society for Photogrammetry and Remote Sensing (2008).
Extended European Search Report for Application No. 12836138.3, dated Mar. 18, 2015.
Follin et al., "Multi-Resolution Extension for Transmission of Geodata in a Mobile Context," Computers & Geosciences, 31:179-188 (2005).
International Preliminary Report on Patentability for Application No. PCT/US2012/057104, dated Apr. 1, 2014.
International Search Report and Written Opinion for Application No. PCT/US2012/057104, dated Feb. 27, 2013.
International Search Report and Written Opinion for Application No. PCT/US2014/038077, dated Sep. 11, 2014.
Mac Aoidh et al., "Personalization in Adaptive and Interactive GIS," *Annals of GIS*, 15(1):23-33 (2009).
Neoseeker, "Bing Maps Combines Raster Tiles and Vector Graphics for Enhanced Experience," Neo Era Media Inc. (1999-2011). Retrieved from the Internet on Sep. 26, 2011: <URL:http://www.neoseeker.com/news/14507-bing-maps-combines-raster-tiles-and-vector-graphics-for-enhanced-experience>.
Sample et al., "Tile-Based Geospatial Information System: Principles and Practices," pp. xi-xiv, 193-203 (Springer 2010).
Zhang et al., "Transmission and Visualization of Large Geographical Maps," ISPRS Journal of Photogrammetry and Remose Sensing, 66:73-80 (2011).
"Zillow Real Estate and Rental Data," (2014).
Office Action for U.S. Appl. No. 14/932,053, dated Nov. 20, 2017.

* cited by examiner

| MinLOD | MaxLOD | Cell | Score | FeatureID |
|---|---|---|---|---|
| 0 | 0 | (0) | 1 | 1 |
| 0 | 30 | (0) | 1 | 2 |
| 1 | 1 | (0,3) | 1 | 3 |
| 1 | 30 | (0,3) | 1 | 4 |
| 2 | 30 | (0,3,2) | 1 | 5 |
| 3 | 5 | (0,3,2,0) | 2 | 6 |
| 6 | 12 | (0,3,2,0,1,1) | 2 | 7 |

| Table | Layer | Range | BucketKey | PrevBucketKey |
|---|---|---|---|---|
| 0 | 0 | 0 | 125000 | None |
| 0 | 0 | 0 | 145000 | 125000 |
| 0 | 0 | 0 | 195000 | 145000 |
| 0 | 0 | 0 | 213000 | 195000 |

| Table | Layer | Range | Bucket Key | Min LOD | Max LOD | Cell | Score | FID | Index Value | # Room |
|---|---|---|---|---|---|---|---|---|---|---|
| 0 | 0 | 0 | 125000 | x | y | (0,0,0) | s | 1 | 125000 | 1 |
| 0 | 0 | 0 | 125000 | x | y | (0,1,1) | s | 6 | 137500 | 1 |
| 0 | 0 | 0 | 145000 | x | y | (0,1,1) | s | 2 | 145000 | 2 |
| 0 | 0 | 0 | 145000 | x | y | (0,2,2) | s | 3 | 175000 | 3 |
| 0 | 0 | 0 | 195000 | x | y | (0,1,2) | s | 5 | 195000 | 4 |
| 0 | 0 | 0 | 195000 | x | y | (0,0,3) | s | 7 | 205000 | 3 |
| 0 | 0 | 0 | 213000 | x | y | (0,0,0) | s | 8 | 213000 | 4 |
| 0 | 0 | 0 | 213000 | x | y | (0,0,0) | s | 4 | 250000 | 5 |

*Fig. 5B*

SYSTEM AND METHOD FOR EFFICIENT GEOSPATIAL INDEXING

CROSS-REFERENCE TO RELATED APPLICATIONS

This application is a continuation of and claims priority to U.S. application Ser. No. 14/932,053 filed on Nov. 4, 2015, entitled "System And Method For Efficient Geospatial Indexing," which claims priority to provisional U.S. Application Ser. No. 62/087,320, filed on Dec. 4, 2014, entitled "System and Method for Efficient Geospatial Indexing," the entire disclosure of which is hereby expressly incorporated by reference herein.

FIELD OF THE DISCLOSURE

The present disclosure relates to digital mapping data and, more particularly, to generating and querying an efficient geospatial index for map features which represent geographic entities.

BACKGROUND

Today, maps of geographic regions may be displayed by software applications running on a wide variety of devices, including mobile phones, car navigation systems, hand-held global positioning system (GPS) units, and computers. Depending on the application and/or user preferences, maps may display topographical data, street data, urban transit information, traffic data, etc. Further, some applications display maps in an interactive mode, so that a user may operate various controls (radio buttons, scrollbars, etc.) to change the zoom level or pan the "camera" to a new location, for example.

SUMMARY

A geospatial indexing module in a server device operates on an index structure which "sparsely" stores geometries as map feature fragments across levels of detail corresponding to nodes of a tree data structure. The tree data structure may include descendant nodes which correspond to a portion of a geographic area at a higher level of detail (LOD) as their respective ancestor nodes (e.g., an ancestor node may represent the entire United States while a descendant node may represent the state of Illinois). The index structure includes a range of levels of detail for each map feature fragment, such that a map feature fragment is stored at a level if the map feature fragment has been substantially simplified relative to the last level (lower magnification) in which the map feature fragment was stored, as explained below.

For example, a first map feature fragment may represent the southwestern border of California for zoom levels 20 to 30 and which corresponds to a particular node(s) in the tree data structure. A second map feature fragment, which represents a much simpler version of the first map feature fragment, may have a zoom range of levels 9-19. When a user requests map data including the southwestern border of California at any of zoom levels 9-19, the system will retrieve and provide the first map feature fragment to the user. More specifically, if the user requests map data including the southwestern border of California at zoom level 16, the system will determine which node(s) of the tree data structure correspond(s) to the southwestern border of California at zoom level 16. For each of those nodes, the system may search the index structure using one or more key range queries for map feature fragments which include the determined nodes or descendant nodes of the determined nodes and have zoom ranges which include zoom level 16. This process may then be repeated for each ancestor node of the determined nodes, for example, until the root node is reached.

In this example, the system may traverse the tree data structure up the tree until ancestor nodes corresponding to zoom level 9 are reached. At zoom level 9, the first map feature fragment may be retrieved because the zoom range of 9-19 includes zoom level 16. At zoom levels 10-19, the system does not retrieve any map feature fragments. In this manner, the system stores one map feature fragment in the index structure for zoom levels 9-19, rather than storing duplicate map feature fragments for each level of detail for which the map feature fragment is valid. Therefore, the system provides a fast, memory efficient technique for retrieving and providing large sets of map data.

In particular, an example embodiment of the techniques of the present disclosure is a method for efficiently indexing geospatial data. The method includes receiving a request from a client device for map data for a particular geographic region and at a particular level of detail (LOD), and selecting at least one node of a tree data structure which corresponds to the requested geographic region and the requested LOD, where each descendant node in the tree data structure corresponds to a portion of a geographic area to which an ancestor node of the descendant node corresponds, and each descendant node corresponds to a higher LOD than the ancestor node corresponds, and wherein the tree data structure is associated with a plurality of map features, each map feature representing a geographic entity and including one or more map feature fragments which represent at least a portion of the corresponding map features, each map feature fragment including a geometry and corresponding to a range of LODs and a node of the tree data structure. The method further includes retrieving, from the plurality of map feature fragments, a subset of map feature fragments, where each fragment of the subset of map feature fragments corresponds to the selected at least one node of the tree data structure or a descendant node of the selected at least one node and includes the requested LOD in the range of LODs for the respective map feature fragment, and providing the retrieved subset of map feature fragments to the client device.

Another embodiment of these techniques is a computing device including a communication interface, one or more processors coupled to the communication interface, and a non-transitory computer-readable memory storing thereon instructions. When executed by the one or more processors, the instructions cause the computing device to receive, via the communication interface, a request from a client device for map data for a particular geographic region and at a particular level of detail (LOD), and select at least one node of a tree data structure which corresponds to the requested geographic region and the requested LOD, where each descendant node in the tree data structure corresponds to a portion of a geographic area to which an ancestor node of the descendant node corresponds, and each descendant node corresponds to a higher LOD than the ancestor node corresponds, and where the tree data structure is associated with a plurality of map features, each map feature representing a geographic entity and including one or more map feature fragments which represent at least a portion of the corresponding map features, each map feature fragment including a geometry and corresponding to a range of LODs and a node of the tree data structure. The instructions further cause the computing device to retrieve from the plurality of map feature fragments, a subset of map feature fragments, where each fragment of the subset of map feature fragments corresponds to the selected at least one node of the tree data structure and includes the requested LOD in the range of LODs for the respective map feature fragment, and provide, via the communication interface, the retrieved subset of map feature fragments to the client device Yet another embodiment of these techniques is a method for performing live filtering of geospatial data. For a plurality of map feature fragments each having a non-spatial attribute, and a corresponding non-spatial attribute value, and representing at least a portion of a map feature which represents a geographic entity, the method includes generating a plurality of buckets, each bucket representing a range of the non-spatial attribute values, and assigning a bucket from of the plurality of buckets to each of the plurality of map feature fragments based on the corresponding non-spatial attribute value for the respective map feature fragment. Upon receiving a request from a client device for map data for a particular geographic region having a non-spatial attribute value within a requested set of non-spatial attribute values, the method includes selecting one or more of the plurality of buckets which correspond to the requested set of non-spatial attribute values, retrieving one or more of the map feature fragments which are assigned the selected one or more buckets and correspond to the requested geographic region, and providing the one or more retrieved map feature fragments to the client device.

BRIEF DESCRIPTION OF THE DRAWINGS

FIG. 4 illustrates an example index structure for map feature fragments;

FIG. 5A illustrates an example "bucket" table where each bucket represents a range of non-spatial attribute values for map feature fragments;

FIG. 5B illustrates an example secondary index structure for map feature fragments and including non-spatial attribute values;

DETAILED DESCRIPTION

Overview

Generally speaking, techniques for generating and querying an efficient geospatial index can be implemented in a geospatial data indexing module operating in a portable computing device, a wearable device, a non-portable computing device, one or several network servers, or a system that includes a combination of these devices. However, for clarity, the examples below focus primarily on an embodiment in which a user requests map data for a specified geographic region at a specified level of detail which may be a zoom level on a client computing device. A server device receives the request and a geospatial data indexing module operating in the server device retrieves map feature fragments corresponding to the request using one or more key range queries on a geospatial index which indexes the map feature fragments. Each map feature fragment may be indexed based on a corresponding node in a tree data structure which spatially organizes the map data and a range of levels of detail in which the map feature fragment is valid. The geospatial data indexing module may then re-assemble the retrieved map feature fragments to generate map features, and the map features may be provided to the client computing device.

Example Hardware and Software Components

Figure 1:
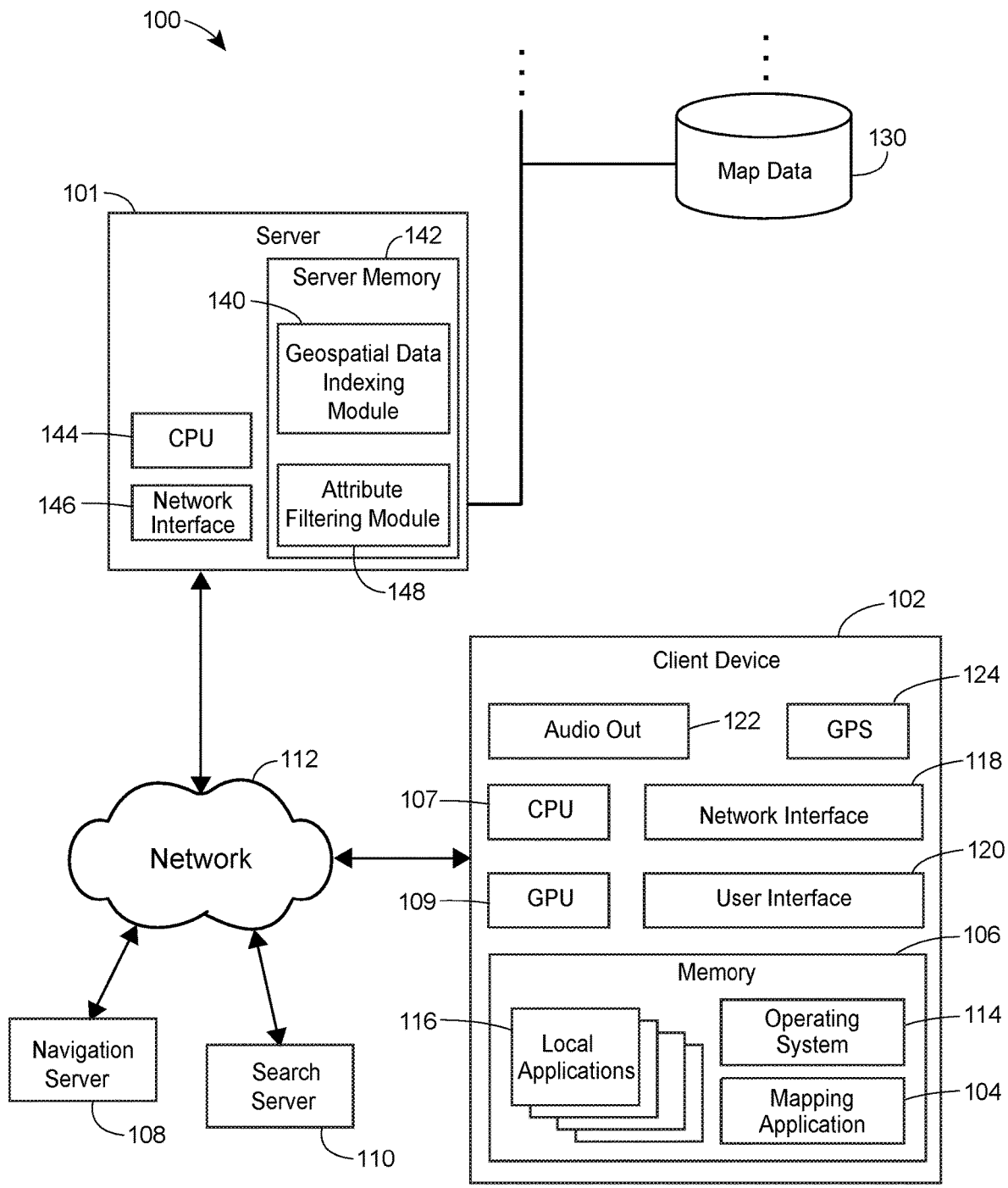
FIG. 1 illustrates a block diagram of an example communication system in which techniques for generating and querying an efficient geospatial index can be implemented.

Referring to FIG. 1, an example computing environment for a system 100 in which the techniques outlined above can be implemented includes a client device 102, a server 101, a navigation server 108, and a search server 110. The client device 102 can display map data using a mapping application 104, which is stored in the memory 106 as a set of instructions and executes on one or more processor(s) (CPU) 107 and/or a graphics processing unit (GPU) 109. The mapping application 104 in general can display map data including map features supplied by the server 101 via a network 112, which can be a wired or wireless network including any suitable local or wide area network (e.g., the Internet). For example, the mapping application 104 may be a special-purpose application available at an online application store disposed at the server 101 or an application server (e.g., Google+™). A user of the client device 102 may retrieve a copy of the mapping application 104 from the application server and install the retrieved copy of the mapping application on the client device 102. In other implementations, the mapping application 104 can be a software component, such as a plug-in, that operates in a web browser (e.g., Google Chrome® or Apple's Safari®) or another application.

The memory 106 may be a tangible, non-transitory memory and may include any types of suitable memory modules, including random access memory (RAM), read-only memory (ROM), a hard disk drive, flash memory, or other types of memory. In addition to the mapping application 104, the memory stores an operating system (OS) 114 and one or more local application(s) 116 or modules. The operating system 114 may be any type of suitable operating system. The one or more local application(s) 116 may include a variety of installed applications including contacts/address book for a user. The applications 116 and the mapping application 104 can receive digital content via a network interface 118. A user can interact with the applications 104 and 116 via a user interface 120, which can include a touchscreen, a screen along with speakers 122, a keyboard and a mouse, a microphone, a camera, a global positioning system (GPS) sensor 124, a WiFi module, etc.

In general, the client device 102 can be any suitable portable or non-portable computing device. By way of example, the client device 102 may be a smartphone, a tablet computer, a laptop computer, a wearable computing device, etc. In various implementations, the client device 102 can include fewer components than illustrated in FIG. 1 or conversely, additional components. In some implementations, for example, the client device 102 may include multiple instances of the CPU 107. For clarity, the client device 102 may be operated by a user who views map data.

The server 101 from which the client device 102 receives map data may be communicatively coupled to one or several databases such as a map database 130 storing map data that can include street and road information, topographic data, satellite imagery, information related to public transport routes, information about businesses or other points of interest (POIs), information about current traffic conditions, information about non-spatial attributes associated with the map data such as weather data, demographic data, and/or energy consumption data for corresponding geographic areas, cost of real-estate properties, department store prices, etc., and a navigation database storing navigation data that can include directions from a source to a destination for various modes of transportation (walking, bicycling, driving, public transportation, etc.). The map data can be stored in the map database 130 in a vector graphics format, a raster format, or both. In general, the server 101 can receive information about geographically related objects from any number of suitable databases, web services, etc. In addition to communicating with the server 101, the client device 102 can communicate with any suitable number of servers via the communication network 112 such as a navigation server 108, a search server 110, a traffic server (not shown), a weather data server (not shown), etc.

It will be understood that although the server is illustrated in FIG. 1 as a single device, in general the server 101 can correspond to multiple servers responsible for respective types of content or respective operations. For example, the server 101 can include a server that stores map features corresponding to a first portion of the Earth and another server that stores map features corresponding to a second portion of the Earth.

In the illustrated implementation, the system for generating and querying efficient geospatial data includes a geospatial data indexing module 140 stored in a server memory 142 and executed by the server CPU 144. The geospatial data indexing module 140 may generate a geospatial index of the map data 130 and query the geospatial index to retrieve map features within a specified geographic region and level of detail in response to a request from the client device 102. For example, a user may request a map of San Francisco at level of detail 6. In some embodiments, level of details range from 0 to 30 where map data displayed at a level of detail of 0 is displayed at the lowest level of magnification and map data displayed at a level of detail of 30 is displayed at the highest level of magnification. In other embodiments, levels of detail range from any suitable numbers. In any event, the geospatial data indexing module 140 may receive the request and query the geospatial index using one or more key range queries to retrieve map feature fragments (portions of map features) within San Francisco at level of detail 6. The geospatial data indexing module 140 may then provide the retrieved fragments for display on client device 102. This technique is described in more detail below.

Also stored in the server memory 142 and executed by the server CPU 144 is an attribute filtering module 148. The attribute filtering module 148 may retrieve map feature fragments having non-spatial attributes values within a requested set of non-spatial attribute values. A non-spatial attribute value may include, for example, weather data, demographic data, energy consumption data, real-estate value data, department store price data, etc., for a map feature fragment. For example, a user may request a map of houses in San Francisco at level of detail 6 which cost more than $1 million. The attribute filtering module 148 may receive the request, and in some embodiments, request the geospatial data indexing module 140 to provide map feature fragments which represent houses in San Francisco at level of detail 6 to the attribute filtering module 148. In other embodiments, the attribute filtering module 148 obtains the map feature fragments within the requested geographic region at the requested level of detail in any suitable manner. The attribute filtering module 148 may then retrieve the houses in San Francisco displayed at level of detail 6 which cost more than $1 million from a secondary index which includes non-spatial attributes values such as real-estate values for corresponding map feature fragments. The retrieved fragments may be provided for display on the client device 102. This technique is also described in more detail below.

Figure 2:
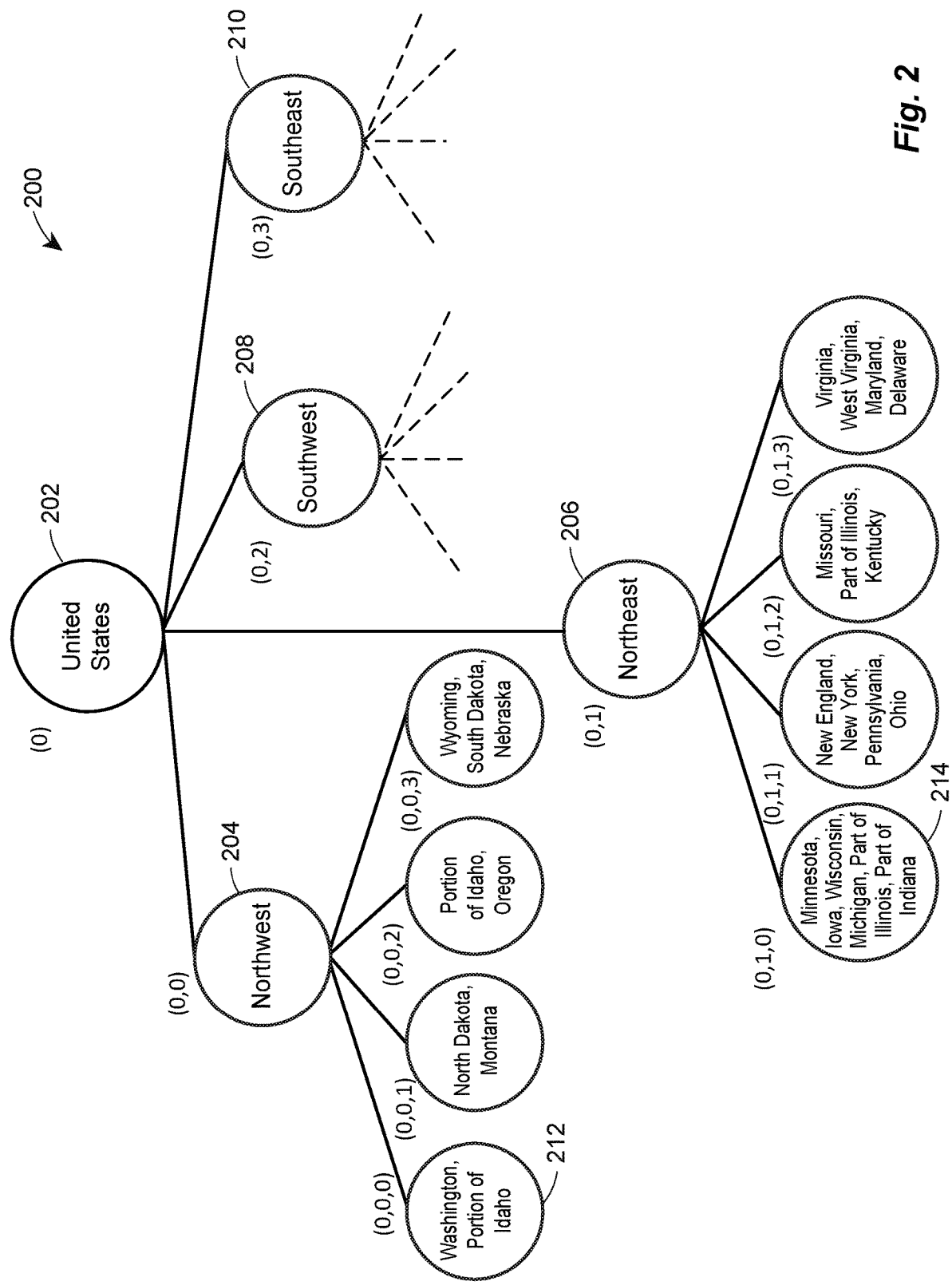
FIG. 2 illustrates an example tree data structure where each node represents a portion of a geographic area.

Turning now to FIG. 2, an example tree data structure 200 (which may be stored at the server 101) spatially organizes map data, for example from the map database 130 of FIG. 1, such that descendant nodes of the tree data structure correspond to a portion of a geographic area at a higher level of detail as their respective ancestor nodes. For example, ancestor node 202 of the tree data structure 200 represents the continental United States. Ancestor node 202 has four children nodes which represent the northwest 204, northeast 206, southwest 208, and southeast 210 quadrants of the United States, respectively. Each of the children nodes has four children nodes which each represent some combination of states or portions of states within the United States. For example, the northwest node 204, has a northwest child node 212 which represents Washington state and a portion of Idaho, and the northeast node 206 has a northwest child node 214 which represents Minnesota, Iowa, Wisconsin, Michigan, a portion of Illinois, and a portion of Indiana.

Each node of the tree data structure may include a map tile which displays the geographic area that the node represents, and may correspond to a level of detail. For example, a node which represents the entire United States may include a map tile at a lower magnification than a descendant node which represents a single state. In some embodiments, the United States node 202 corresponds to level of detail 0, the northwest 204, northeast 206, southwest 208, and southeast 210 nodes correspond to level of detail 1, and the descendant nodes 212, 214 representing states or portions of states correspond to level of detail 2. In other embodiments, level of detail 0 may correspond to a node which represents the world.

Furthermore, each node of tree data structure may be identified by a cell identification (ID), which in some embodiments may be an s2 cell ID along a Hilbert curve. In other embodiments, the nodes of the tree data structure may be identified in any other suitable manner. In the example tree data structure 200, the cell ID for the United States node 202 may be (0), the cell ID for the northwest node 204 may be (0,0), the cell ID for the northeast node 206 may be (0,1), the cell ID for the southwest node 208 may be (0,2), and the cell ID for the southeast node 210 may be (0,3). For each respective descendant node, a first portion of the descendant node's cell ID may be the same as the cell ID for the parent of the descendant node, and a second portion of the cell ID may be based on the location of the descendant node with respect to the parent. For example, the descendant node 212 which represents Washington state and a portion of Idaho has cell ID (0,0,0) which includes a first portion (0,0) that is the same as the cell ID for northwest node 204, followed by a second portion (0) indicating that the descendant node 212 represents the northwest quadrant of the northwest node 204. This is merely one example in which the nodes of the tree data structure 200 may be identified, and in other embodiments the nodes may be identified in any other suitable manner.

While the example tree data structure 200 includes nodes at three levels of detail, this is merely for ease of illustration only. The tree data structure 200 may include nodes at 10 levels of detail, at 20 levels of detail, or any other suitable number of levels of detail. Moreover, while the example tree data structure 200 is illustrated as a quadtree (a data structure in which a node has at most four children), the tree data structure may be a binary tree, an octree (a data structure in which a node has at most eight children), a k-d tree or any other suitable tree data structure which spatially organizes map data.

For each map tile included in the nodes of the example tree data structure 200, there may be one or several map features which represent geographic entities. For example, a map feature may be a state, a city, a street, a road, a highway, a town, a public transportation hub, a body of water, a shopping center, a department store, a neighborhood, a building, a home, a restaurant, etc., or some combination thereof. Each map feature may be made up of one or several map feature fragments where the map feature fragments may be combined to represent the map feature. For example, a map feature which represents the borders of Colorado may be made up of a first map feature fragment which represents the northern, eastern, and western borders of Colorado and a second map feature fragment which represents the southern border of Colorado.

Figure 3:
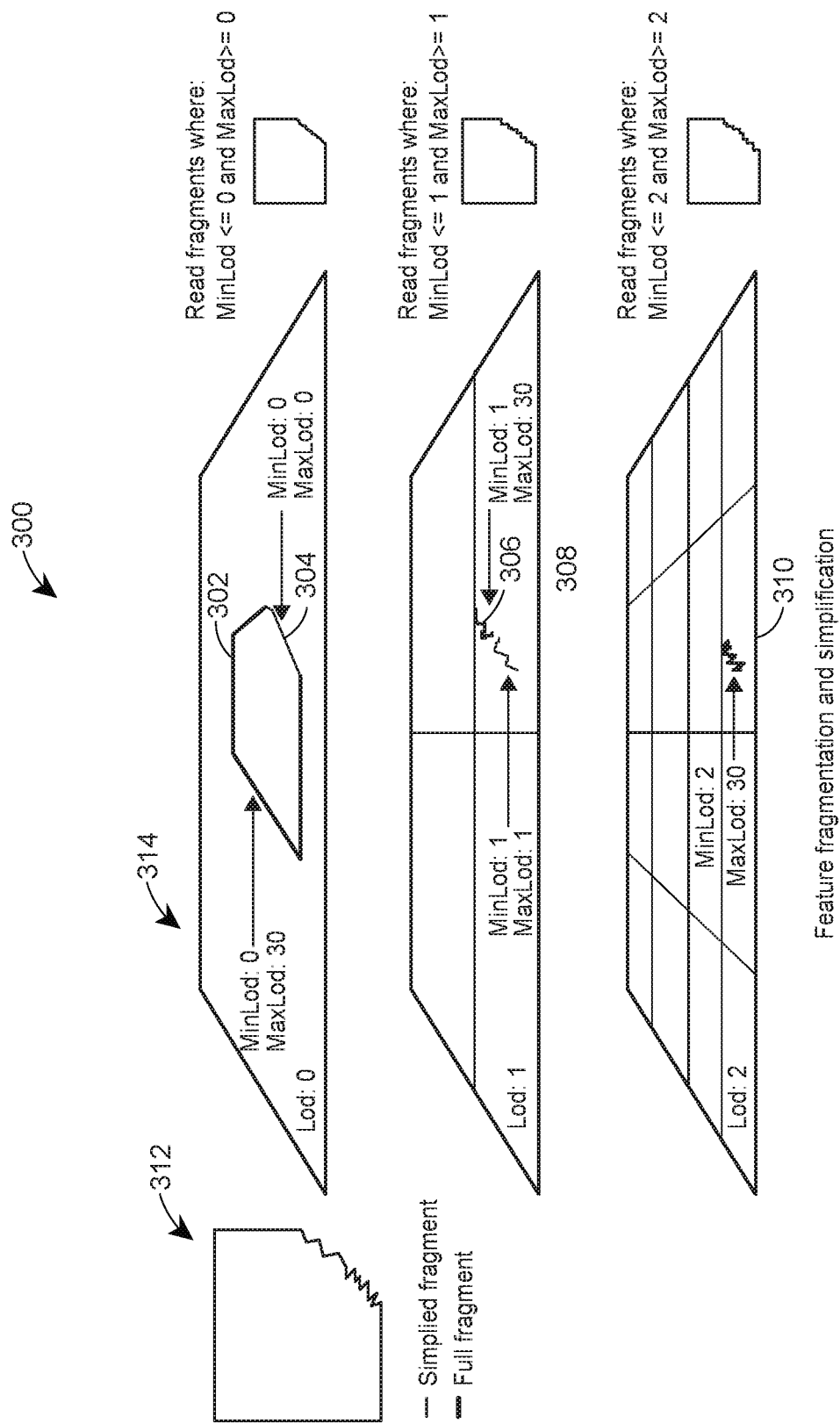
FIG. 3 illustrates an example map display which presents nap feature fragments that combine to display a map feature at various levels of detail.

FIG. 3 illustrates an example map display 300 which presents map feature fragments that combine to display a map feature at various levels of detail. An original map feature 312 is depicted in FIG. 3 which represents, for example, the borders of a state. The original map feature 312 is then divided into map feature fragments by, for example, the geospatial data indexing module 140 of FIG. 1, where each map feature fragment includes a geometry, which may be a polygon, a polyline, a point, etc., such as the shape of map feature fragment 310. The map feature fragment also corresponds to a range of levels of detail. In the example map display 300, the levels of detail may range from 0 to 30 such that level 0 is the lowest level of magnification and level 30 is the highest level of magnification.

Map feature fragments may be generated with traversal of the tree data structure in the upward direction, starting from the highest level of detail (or from the bottom of the corresponding tree data structure). For example, at the highest level of detail (level 30), map feature fragments may be generated which combine to represent the original map feature 312. At lower levels of detail, for example at level 1, simplified map feature fragments may be generated to replace some of the map feature fragments at the higher levels of detail. The simplified map feature fragments may combine with original map feature fragments to represent a simplified version of the map feature. In this manner, only map feature fragments having vertices which can be differentiated by a user at the requested level of detail are displayed. In some embodiments, when a map feature fragment contains vertices which cannot be differentiated at a certain level of detail, a simplified version of the map feature fragment is generated for a range of levels of detail which include the level of detail. This simplified version is displayed for each lower level of detail until a level of detail is reached in which vertices of the simplified version can no longer be differentiated.

Each level of detail in the example map display 300 may correspond to the levels of detail in the example tree data structure 200 of FIG. 2. For example, the rectangle 314 at level of detail 0 may represent a map tile of the United States, each of the four rectangles at level of detail 1 may represent a map tile of one of the northwest, northeast, southwest, and southeast quadrants of the United States respectively, and each of the sixteen rectangles at level of detail 2 may represent a map tile of some combination of states or portions of states.

At level of detail 2, map feature fragment 310 which has a level of detail range of 2-30 is displayed along with map feature fragment 306 which has a level of detail range of levels 1-30, and map feature fragment 302 which has a level of detail range of levels 0-30. Fragments 310, 306, and 302 combine to represent the original map feature 312. Then at level of detail 1, map feature fragment 310 is replaced by map feature fragment 308 which has a level of detail range of levels 1-1. Fragments 308, 306, and 302 combine to represent a simplified version of the original map feature. Moreover, at level of detail 0, map feature fragments 306 and 308 are replaced by map feature fragment 304 which has a level of detail range of levels 0-0. Fragments 304 and 302 combine to represent a further simplified version of the original map feature.

Figure 4:
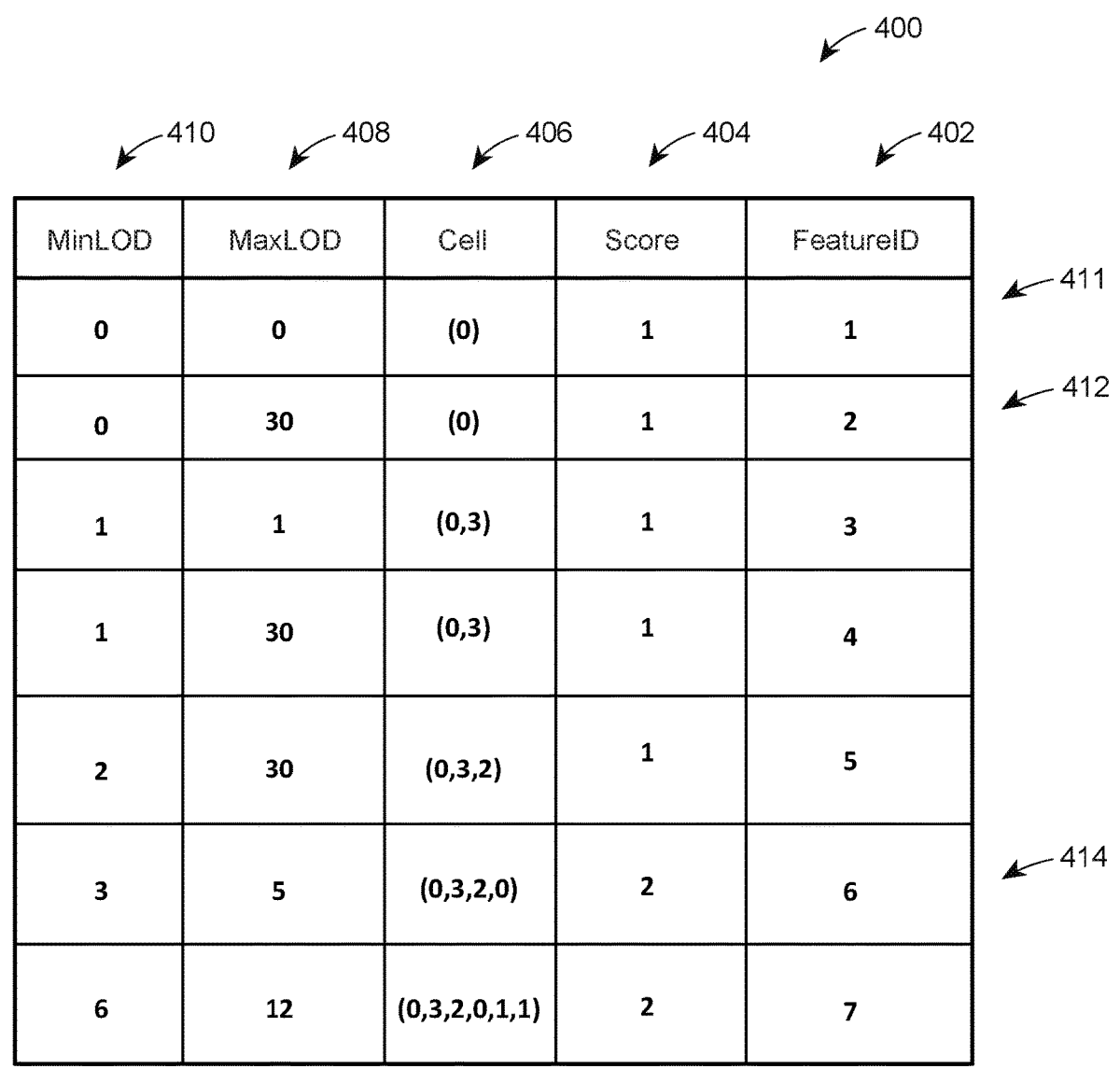

To display each of the map feature fragments at a requested level of detail, the geospatial data indexing module 140, generates an index of map feature fragments which includes a geometry and a corresponding range of levels of detail and node in the tree data structure 200 for each map feature fragment. The geospatial data indexing module 140 then queries the index using one or more key range queries for map feature fragments based on a request from a client device 102, and provides the retrieved map feature fragments to the client device 102. An example index of map feature fragments 400 is illustrated in FIG. 4.

Each row in the index 400 includes a feature ID 402 which uniquely identifies a map feature fragment. The feature ID may correspond to a geometry for a map feature fragment such as the geometry of map feature fragment 310 in FIG. 3, a starting and/or ending position for placing the map feature fragment within a corresponding map tile, a table that stores the map feature fragment, a style for the map feature fragment, a layer for the map feature fragment, etc. Each of the geometry, starting position, ending position, table, style, and layer for the map feature fragment may be included as columns in the index 400 or may be included in a different index on the server 101.

In any event, the index 400 also includes an indication of a cell 406 which corresponds to the feature ID. In some embodiments, a map feature fragment corresponds to the cell for the lowest node in the tree data structure (highest magnification) which fully contains the map feature fragment. For example, feature ID 1 (reference 411) corresponds to cell (0), indicating that the map feature fragment for feature ID 1 is fully contained within cell (0). The index 400 further includes a range of levels of detail for which the map feature fragment is valid. For example, feature ID 2 (reference 412) is valid from min LOD 0 (reference 410) to max LOD 30 (reference 408). In some embodiments, the minimum level of detail for a map feature fragment is at the same level of detail as the corresponding cell for the map feature fragment. In other embodiments, the minimum level of detail for a map feature fragment is at a lower or higher level of detail as the corresponding cell for the map feature fragment. Using feature ID 2 (reference 412) as an example and referring back to FIG. 3, feature ID 2 (reference 412) may be the same as map feature fragment 302, because map feature fragment 302 has a level of detail range of 0 to 30 and is fully contained in the rectangle 314 which may be cell (0).

In addition to a level of detail range and a corresponding cell for each map feature fragment, the example index 400 includes a score which indicates a priority level ranking for displaying map feature fragments at a given level of detail. In some embodiments, the score is the same for all map feature fragments in a map feature. Also in some embodiments, a maximum number of map feature fragments may be displayed for a given level of detail, before the map display becomes too densely packed and is difficult to read. If there are more map feature fragments than the maximum, the geospatial data indexing module 140 may provide map feature fragments to the client device 102 based on their respective scores.

For example, feature ID 2 (reference 412) has a score of 1, a level of detail range of 0 to 30, and corresponds to cell (0). Feature ID 6 (reference 414) has a score of 2, a level of detail range of 3 to 5, and corresponds to cell (0,3,2,0). If a user requests map data at level of detail 4 for a region which includes cell (0,3,2,0) or an ancestor or descendant of cell (0,3,2,0), at least a portion of feature ID 2 (reference 412) and feature ID 6 (reference 414) may be retrieved. However, feature ID 2 (reference 412) will have priority over feature ID 6 (reference 414) because of the lower score for feature ID 2 (reference 412). Depending on the maximum number of fragments, the geospatial data indexing module 140 may only provide map feature fragments for the requested region and level of detail which have a score of 1 to the client device 102.

When a user requests map data for a specified geographic region at a level of detail, the geospatial data indexing module 140 may determine which nodes of the tree data structure correspond to the request. For example, if the user requests map data for the southeastern United States at level of detail 1, the geospatial data indexing module 140 may determine that cell (0,3) as shown in FIG. 2 corresponds to the request. The specified geographic region may be a bounded region of latitude/longitude coordinates or may be specified in any other suitable manner.

The geospatial data indexing module 140 may then query the index 400 for map feature fragments which correspond to cell (0,3) or any of the descendant nodes of cell (0,3), and which include level of detail 1 in their respective level of detail ranges. For example, the index 400 may be queried using one or more key ranges from cell (0,3) to cell (0,4) to retrieve map feature fragments which correspond to cell (0,3) and map feature fragments which correspond to descendant nodes of cell (0,3). Furthermore, the one or more key ranges may be from minimum level of detail 0 to 1 and maximum level of detail 1 to 30. For example, in some embodiments, the index may be queried using a key range from cell (0,3) to cell (0,4) from minimum level of detail 0 to maximum level of detail 1, using a key range from cell (0,3) to cell (0,4) from minimum level of detail 0 to maximum level of detail 2, using a key range from cell (0,3) to cell (0,4) from minimum level of detail 0 to maximum level of detail 3, etc., until all permutations of the range of minimum level of detail and maximum level of detail are utilized.

The index 400 may be organized so that each key range query may begin at the first row in the index which includes data within the key range and ends after the last row in the index which includes data within the key range. As a result, the key range query may begin at a row which includes cell (0,3) and end when a row which includes cell (0,4) is reached.

In an alternative embodiment, the index 400 may be searched by scanning each row in the index 400 and determining whether the cell ID for the respective row corresponds to the determined cell ID or any descendant nodes of the determined cell ID. However, in such an embodiment each row in the index 400 may need to be searched and compared to the determined cell ID or descendant nodes of the determined cell ID. This can be very time consuming, particularly when there are thousands or millions of rows in the index. On the other hand, by using a key range only a portion of the index is queried (e.g., rows which include cell (0,3) to cell (0,4)), without needing to store secondary indexes or initially filter results as in a structured query, thereby saving time and increasing efficiency. In this manner, the index 400 is structured such that map feature fragments may be retrieved using key ranges in addition or as an alternative to a structured query.

Based on this query, the geospatial data indexing module 140 may retrieve feature ID 3 which corresponds to cell (0,3) and has a level of detail range of 1-1, and feature ID 4 which also corresponds to cell (0,3) and has a level of detail range of 1-30 from the index 400. Feature IDs 5-7 each correspond to descendant nodes of cell (0,3), but none of these map feature fragments include level of detail 1 in their respective level of detail ranges.

The geospatial data indexing module 140 may also query the index 400 for map feature fragments which correspond to ancestor nodes of cell (0,3), for example cell (0), and include level of detail 1 in their respective level of detail ranges. For example, the index 400 may be queried using one or more key ranges of cell (0) from minimum level of detail 0 to 1 and maximum level of detail 1 to 30, to retrieve map feature fragments which correspond to ancestor nodes of cell (0,3). Based on this query, the geospatial data indexing module 140 may retrieve feature ID 2 (reference 412) which corresponds to cell (0) and has a level of detail range of 0-30. The geospatial data indexing module 140 may then re-assemble each of the retrieved map feature fragments (feature IDs 2-4) and provide the resulting map feature to the client device 102, or may provide the retrieved map feature fragments to the client device 102 for the client device 102 to re-assemble.

In an alternative embodiment, in addition to the index 400 described above, the geospatial data indexing module 140 generates a metadata index which may be used to efficiently query the index 400. For example, when the index 400 (also referred to herein as a "main index") includes less than a predetermined threshold number of map feature fragments (e.g., 1,000, 10,000, etc.), the geospatial indexing module 140 may query the metadata index and then query the main index 400 using the results from the metadata index query. The metadata index includes a row for each map feature fragment in the main index 400 including an indication of a cell corresponding to the map feature fragment and a range of levels of detail for which the map feature fragment is valid, such as a minimum level of detail and a maximum level of detail. For example, if a map feature fragment exists in cell (0, 2, 0) having a level of detail range of 0 to 7, then a query of the metadata index for cell (0, 2, 0) may return the cell and the level of detail ranges for map feature fragments within the cell: [(0, 2, 0), 0, 7].

When a user requests map data for a specified geographic region at a level of detail (e.g., corresponding to cell (0, 2, 0) at level of detail 2), the geospatial data indexing module 140 may query the metadata index for level of detail ranges which correspond to the specified geographic region (e.g., corresponding to cell (0, 2, 0) and/or corresponding to ancestor and descendant nodes of cell (0, 2, 0). Upon receiving the level of detail ranges, the geospatial data indexing module 140 may perform a key range query of the main index 400 from cell (0, 2, 0) to cell (0, 2, 1) for the received level of detail ranges. Using the example above where the metadata index query for cell (0, 2, 0) returns one level of detail range (minimum level of detail 0 to maximum level of detail 7), the geospatial data indexing module 140 may query the main index 400 from cell (0, 2, 0) to cell (0, 2, 1) having minimum level of detail 0 and maximum level of detail 7.

In other scenarios, the metadata index query for a specified geographic region may return any number of level of detail ranges corresponding to the number of map feature fragments within the specified geographic region. Accordingly, the geospatial indexing module 140 may query the main index 400 over the specified geographic region (e.g., from cell (0, 2, 0) to cell (0, 2, 1) for each of the level of detail ranges (e.g., minimum level of detail 0 and maximum level of detail 3, minimum level of detail 1 and maximum level of detail 10, minimum level of detail 1 and maximum level of detail 15, etc.). In any event, using the metadata index may be much more efficient than querying the main index 400 using a key range from cell (0, 2, 0) to cell (0, 2, 1) and from each of minimum levels of detail 0 to 2 and maximum levels of detail 2 to 30, until all permutations of the range of minimum levels of detail and maximum levels of detail are utilized, as in the examples above. In this manner, the key range query may be processed faster than iterating through each permutation of minimum and maximum levels of detail which include the requested level of detail.

In some embodiments, results from the metadata index may be cached so that the results can be re-used for every subsequent query of the main index 400 which includes the same cell. For example, upon querying the metadata index for cell (0), the returned level of detail ranges for cell (0) may be re-used for every subsequent query because cell (0) is an ancestor node of every cell.

In another alternative embodiment, in addition to the main index 400 described above, the geospatial data indexing module 140 generates a valid level of detail metadata index which may be used to efficiently query the main index 400. For example, when the main index 400 includes more than the predetermined threshold number of map feature fragments (e.g., 1,000, 10,000, etc.), the geospatial indexing module 140 may query the valid level of detail metadata index and then query the main index 400 using the results from the valid level of detail metadata index.

The valid level of detail metadata index includes a row for each cell having one or more map feature fragments for a particular minimum level of detail. For example, cell (2, 2) may have three map feature fragments, where a first map feature fragment corresponds to minimum level of detail 0 and maximum level of detail 0, a second map feature fragment corresponds to minimum level of detail 0 and maximum level of detail 24, and a third map feature fragment corresponds to minimum level of detail 1 and maximum level of detail 24. In this example, the valid level of detail metadata index may include a first row for cell (2, 2), minimum level of detail 0, and maximum levels of detail 0 and 24, and a second row for cell (2, 2), minimum level of detail 1 and maximum level of detail 24.

Additionally, the valid level of detail metadata index may merge map feature fragments for cells corresponding to a level of detail greater than a predetermined threshold (e.g., level of detail 2) into the ancestor cell corresponding to the predetermined threshold level of detail. For example, when the threshold level of detail is 1, a map feature fragment corresponding to cell (2, 2, 2, 2, 2, 2, 2) and having a level of detail range 7 to 16 may be merged into cell (2, 2) which is an ancestor node of cell (2, 2, 2, 2, 2, 2, 2) and which corresponds to the threshold level of detail. Accordingly, the valid level of detail metadata index may include a row for cell (2, 2) having minimum level of detail 7 and maximum level of detail 16.

When a user requests map data for a specified geographic region at a level of detail (e.g., corresponding to cell (2, 2) at level of detail 1), the geospatial data indexing module 140 may query the valid level of detail metadata index for level of detail ranges which correspond to the specified geographic region (e.g., corresponding to cell (2, 2) and/or corresponding to ancestor and descendant nodes of cell (2, 2)). If there is no metadata for the specified geographic region, the geospatial indexing module 140 may query the main index 400 using a key range from cell (2, 2) to cell (2, 3) and from each of minimum levels of detail 0 to 1 and maximum levels of detail 1 to 30, until all permutations of the range of minimum levels of detail and maximum levels of detail are utilized, as in the examples above.

On the other hand, if there is metadata for the specified geographic region in the valid level of detail metadata index, the geospatial data indexing module 140 may perform a key range query of the main index 400 from cell (2, 2) to cell (2, 3) for the received level of detail ranges. In the example above, the level of detail ranges include minimum level of detail 0 and maximum level of detail 0, minimum level of detail 0 and maximum level of detail 24, minimum level of detail 1 and maximum level of detail 24, and minimum level of detail 7 and maximum level of detail 16. Additionally, because the user requests map data for level of detail 1, level of detail ranges which do not include level of detail 1 are removed from the key range query. As a result, level of detail range 0 to 0 and level of detail range 7 to 16 are filtered out. Accordingly, the geospatial indexing module 140 may query the main index 400 from cell (2, 2) to (2, 3) and for level of detail ranges 0 to 24 and 1 to 24. In this manner, the key range query may be processed faster than iterating through each permutation of minimum and maximum levels of detail which include the requested level of detail.

Turning back to FIG. 1, in addition to the geospatial data indexing module 140, the server memory 142 includes an attribute filtering module 148 which may be executed by the server CPU 144. The attribute filtering module 148 may include an index of non-spatial attribute values for map features and/or map feature fragments. When a user requests map data for map feature fragments having a non-spatial attribute value within a set of non-spatial attribute values and within a geographic region and level of detail, the attribute filtering module 148 may retrieve the map feature fragments corresponding to the geographic region and level of detail using the geospatial indexing module 140. In other embodiments, the attribute filtering module 148 retrieves the map feature fragments corresponding to the geographic region and level of detail using another index or data structure or in any other suitable manner.

In any event, some of the retrieved map feature fragments may include a non-spatial attribute value. For example, if the requested non-spatial attribute is the price of homes and the requested non-spatial attribute value is a range of housing prices, the retrieved map feature fragments which represent houses may include housing prices. In some embodiments, the non-spatial attribute values have a continuous range. For example, housing prices can be $100,000.50, $100,000.70, etc., and can include any other fraction of a dollar. Another non-spatial attribute may be temperature. Temperature can include fractions of a degree and therefore the range of temperatures is continuous. In some embodiments, a non-spatial attribute value for a map feature fragment is placed in a secondary index structure when the map feature fragment is initially indexed.

An example secondary index structure 550 is illustrated in FIG. 5B which includes non-spatial attribute values for map feature fragments. Non-spatial attribute values in FIG. 5B include housing prices and are illustrated in column 552. Feature ID 1 has a housing price of $125,000, feature ID 6 has a housing price of $137,500, feature ID 2 has a housing price of $145,000, etc. Additionally, the secondary index structure also includes non-spatial attribute values indicating the number of rooms in a house in column 554. To filter map feature fragments based on a requested set of non-spatial attribute values, the attribute filtering module 148 may generate several buckets where each bucket corresponds to a range of non-spatial attribute values, and assign a bucket to each of the map feature fragments. As used in this disclosure, the term "bucket" refers to a collection of data sharing one or several properties. For example, the attribute filtering module 148 may generate a $125,000 bucket which is assigned to map feature fragments which have a housing price from $125,000 to $145,000.

Buckets may be generated in an evenly distributed manner so that each bucket is assigned to nearly the same amount of map feature fragments. In some embodiments, the attribute filtering module 148 also includes a maximum or a minimum number of map features fragments which can be assigned to a bucket. To assign nearly the same amount of map feature fragments to each bucket, the attribute filtering module 148 may generate a distribution of non-spatial attribute values for the map feature fragments. For example, the attribute filtering module 148 may generate a histogram or a cumulative distribution function of the housing prices in column 552, and determine quantiles based on the distribution. The quantiles may be tertiles, quartiles, quintiles, percentiles, or any other type of quantile, and the attribute filtering module 148 may generate a bucket corresponding to each quantile. The type of quantile may depend on the maximum or minimum number of map feature fragments which can be assigned to a bucket.

In the example secondary index 550, a bucket may be generated that corresponds to the minimum housing price and for every quartile in the distribution of housing prices. As shown in the bucket index 500 of FIG. 5A, the minimum housing price may be $125,000, the first quartile or $25^{th}$ percentile may be $145,000, the second quartile or $50^{th}$ percentile may be $195,000, and the third quartile or $75^{th}$ percentile may be $213,000. As a result, the first bucket ($125,000) may be assigned to all map feature fragments having non-spatial attribute values from $125,000 to $145,000; the second bucket ($145,000) may be assigned to all map feature fragments having non-spatial attribute values from $145,000 to $195,000; the third bucket ($195,000) may be assigned to all map feature fragments having non-spatial attribute values from $195,000 to $213,000; and the fourth bucket ($213,000) may be assigned to all map feature fragments having non-spatial attribute values from $213,000 and above.

When a user requests map data for map features having non-spatial attribute values within a set of non-spatial attribute values, the attribute filtering module 148 selects buckets which contain at least one non-spatial attribute value within the requested set of non-spatial attribute values. For example, if the user requests map data for houses which cost between $150,000 and $210,000, the attribute filtering module 148 selects the $145,000 bucket, because the $145,000 to $195,000 range includes at least one value greater than $150,000 and less than $210,000. Moreover, the attribute filtering module 148 also selects the $195,000 bucket, because the $195,000 to $213,000 range includes at least one value greater than $150,000 and less than $210,000. The other two buckets do not include any of the requested set of non-spatial attribute values in their respective ranges. In some embodiments, the attribute filtering module 148 may select buckets by querying the bucket index 500 for buckets having at least one non-spatial attribute value within the key range of $150,000 to $210,000.

The attribute filtering module 148 then uses the selected buckets to query the secondary index 550 for map feature fragments assigned to the selected buckets using one or more key ranges spanning the selected buckets (e.g., the $145,000 bucket and the $195,000 bucket). Based on this query, the attribute filtering module 148 may retrieve feature ID 2 having a housing price of $145,000, feature ID 3 having a housing price of $175,000, feature ID 5 having a housing price of $195,000, and feature ID 7 having a housing price of $205,000.

After retrieving map feature fragments for the selected buckets, the attribute filtering module 148 may perform post-filtering steps on the retrieved map feature fragments. For example, the non-spatial attribute value for each retrieved map feature fragment may be compared to the requested set of non-spatial values, and map feature fragments outside of the requested set of non-spatial attribute values may be filtered out. In this example, feature ID 2 having a housing price of $145,000 may be filtered out because it is less than the $150,000 minimum specified in the requested set of non-spatial attribute values. Moreover, additional filters for additional non-spatial attribute values (e.g., number of rooms in the house) may also be applied to the retrieved map feature fragments.

In an alternative embodiment, the attribute filtering module 148 may query the secondary index 550 for map feature fragments having non-spatial attribute values within the requested set of non-spatial attribute values and within a geographic region according to their respective cells. In this manner, the secondary index 550 may include a column (not shown) for a number of map feature fragments which correspond to a cell and a bucket, and in some embodiments, feature IDs for the corresponding map feature fragments. This may provide a condensed secondary index when compared to the secondary index 550 which includes an additional row for each map feature fragment.

In yet another embodiment, the attribute filtering module 148 may generate a set of buckets for each cell, by generating a distribution of non-spatial attribute values for map feature fragments corresponding to a particular cell and determining quantiles based on the distribution. Buckets may be assigned according to each quantile, so that buckets may be evenly distributed within the cell. The attribute filtering module 148 may then query the secondary index 550 for map feature fragments having non-spatial attribute values within the requested set of non-spatial attribute values and within a geographic region according to their respective cells. Moreover, the attribute filtering module 148 may also query the secondary index temporally using the time in which a map feature fragment is added to the secondary index.

Figure 6:
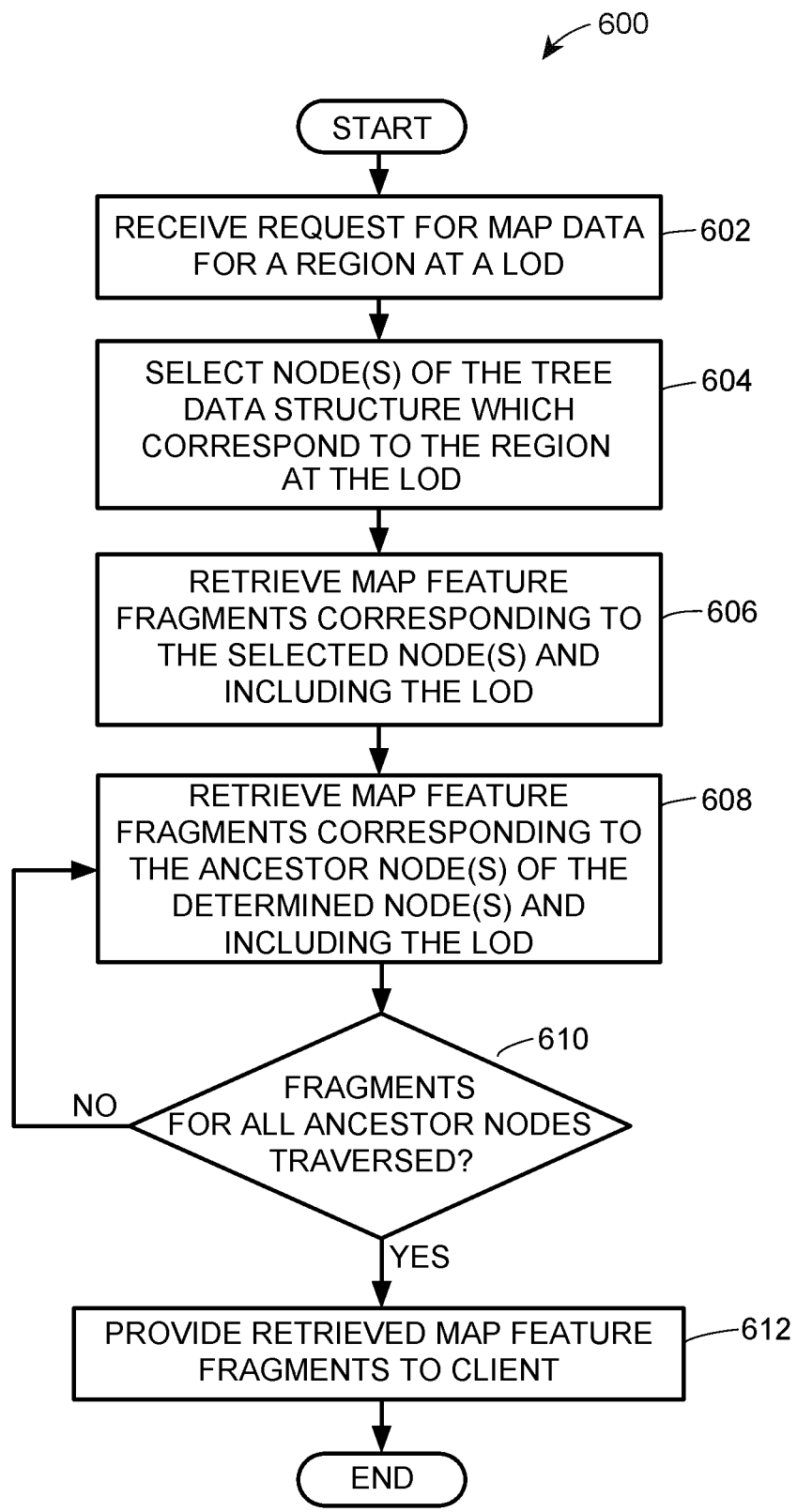
FIG. 6 is a flow diagram of an example method for querying an efficient geospatial index at a server device.

FIG. 6 illustrates a flow diagram of an example method 600 for querying an efficient geospatial index at a server device 101. In some embodiments, the method 600 is implemented in a set of instructions stored on a non-transitory computer-readable memory and executable on one or more processors of the server device 101. For example, the method 600 may be performed by the geospatial data indexing module 140.

At block 602, the server device 101 receives a request for map data for a specified geographic region (e.g., a bounded set of latitude/longitude coordinates) at a level of detail from a client device 102. The geospatial data indexing module 140 selects nodes of a tree data structure (block 604), such as the example tree data structure 200 of FIG. 2, which correspond to the geographic region at the specified level of detail (e.g., cell (0,2,1,2)). The tree data structure may be a binary tree, a quad tree, an octree, etc. Moreover, each node of the tree data structure may be identified by a cell representing a portion of a geographic area at a level of detail, and may include a map tile which displays the portion of the geographic area identified by the cell. Descendant nodes of the tree data structure correspond to a portion of a geographic area at a higher level of detail as their respective ancestor nodes.

Furthermore, the geospatial data indexing module 140 indexes map feature fragments which combine to create map features that represent geographic entities. Each map feature fragment includes a geometry and corresponds to a node in the tree data structure which includes a map tile in which the map feature fragment is fully contained. Moreover, for each map feature fragment a range of levels of detail is included in the index for which the map feature fragment is valid.

At block 606, the geospatial data indexing module 140 retrieves map feature fragments from the index which correspond to one of the nodes selected at block 604 and include the requested level of detail in their respective ranges of levels of detail. The geospatial data indexing module 140 may also retrieve map feature fragments which correspond to descendant nodes of the nodes selected at block 604 and include the requested level of detail in their respective ranges of levels of detail. For example, the index may be queried using one or more key ranges over a range of cells which correspond to the node selected at block 604 and each of the node's descendant nodes (e.g., from cell (0,2,1,2) to cell (0,2,1,3)). The one or more key ranges may also be for map feature fragments having a minimum level of detail between the lowest level of detail and the requested level of detail, and having a maximum level of detail between the requested level of detail and the highest level of detail. For example, in some embodiments, the index may be queried using a key range for each permutation within the range of minimum level of detail and maximum level of detail.

Then at block 608, map feature fragments which correspond to ancestor nodes of the nodes selected at block 604 and which include the requested level of detail in their respective ranges of levels of detail are retrieved. For example, the index may be queried using one or more key ranges over a cell corresponding to an ancestor node of the node selected at block 604 (e.g., cell (0,2,1)), and having a minimum level of detail between the lowest level of detail and the requested level of detail, and a maximum level of detail between the requested level of detail and the highest level of detail.

The geospatial data indexing module 140 traverses the tree data structure upward and retrieves map feature fragments corresponding to each ancestor node of the selected node until all ancestor nodes are traversed (e.g., cell (0,2), cell (0), etc.) (block 610). Then the retrieved map feature fragments are provided to the client device 102 (block 612). In some embodiments, the geospatial data indexing module 140 re-assembles the map feature fragments into map features and provides the map features to the client device 102. In other embodiments, the client device 102 re-assembles the map feature fragments.

Figure 7:
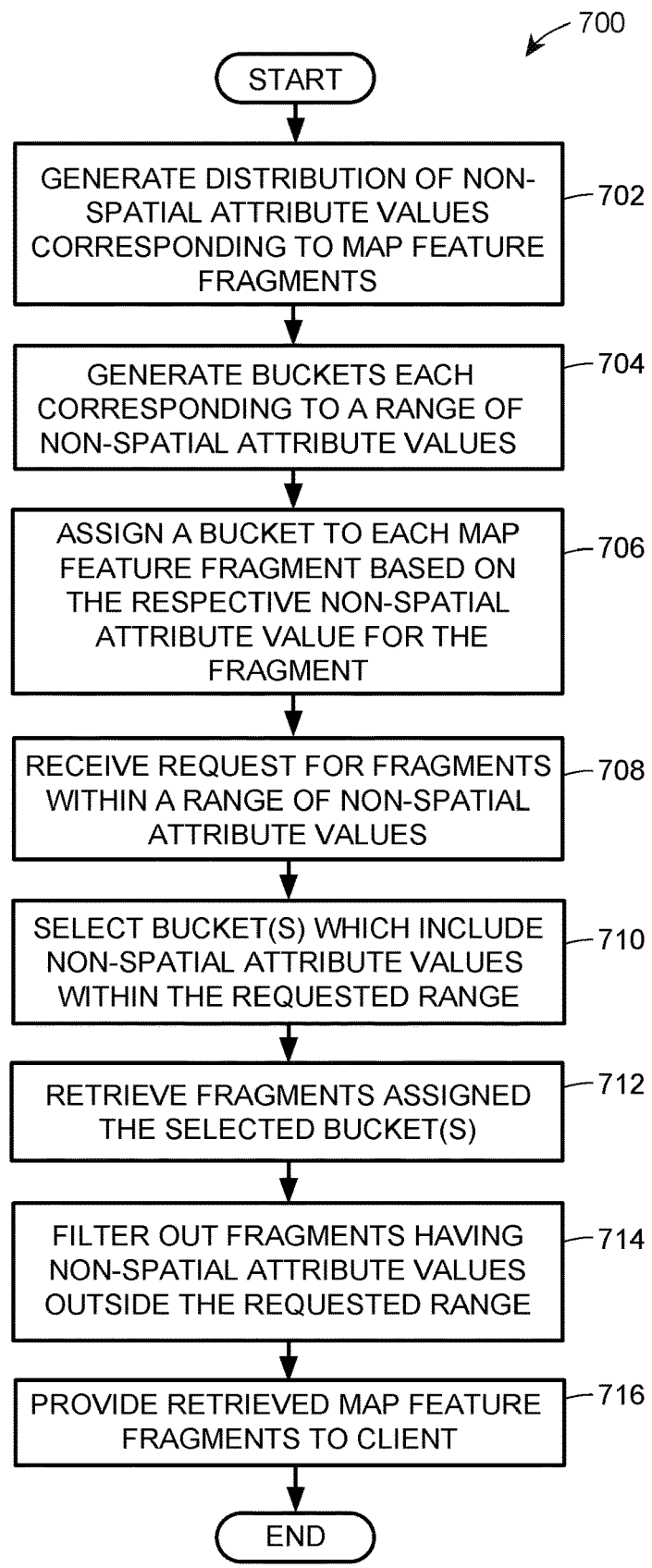
FIG. 7 is a flow diagram of an example method for filtering geospatial data according to non-spatial attribute values at a server device.

FIG. 7 illustrates a flow diagram of an example method 700 for filtering geospatial data according to non-spatial attribute values at a server device 101. In some embodiments, the method 700 is implemented in a set of instructions stored on a non-transitory computer-readable memory and executable on one or more processors of the server device 101. For example, at least a portion of the method 700 may be performed by the attribute filtering module 148.

At block 702, the attribute filtering module 148 may generate a distribution of non-spatial attribute values corresponding to map feature fragments. For example, the non-spatial attribute may be an average energy consumption per day, and the non-spatial attribute values for the map feature fragments may be anywhere from 100 kilowatt hours per day (kWh/day) to 100,000 kWh/day.

The attribute filtering module 148 may then generate buckets each corresponding to a range of non-spatial attribute values (block 704), and assign a bucket to each map feature fragment (block 706). A map feature fragment is assigned a bucket having a range of non-spatial attribute values which includes the map feature fragment's non-spatial attribute value. For example, a map feature fragment which consumes 1000 kWh/day may be assigned a bucket which includes a range of 900 kWh/day to 1500 kWh/day.

At block 708, the server device 101 may receive a request for map data which includes map feature fragments having non-spatial attribute values within a requested set of non-spatial attribute values. In some embodiments, the request may also specify a geographic region and a level of detail for the map data. The attribute filtering module 148 may instruct the geospatial data indexing module 140 to retrieve map feature fragments corresponding to the requested geographic region and level of detail using one or more key ranges, or may retrieve the map feature fragments in any other suitable manner. The attribute filtering module 148 may then select buckets which contain at least some non-spatial attribute values which are within the requested set (block 710). For example, if the requested set is less than 400 kWh/day and greater than 10,000 kWh/day, then the attribute filtering module 148 may select all buckets having a maximum energy consumption value of less than 400 kWh/day, and buckets which contain 400 kWh/day within their respective energy consumption value ranges. The attribute filtering module 148 may also select all buckets having a minimum energy consumption value of greater than 10,000 kWh/day, and buckets which contain 10,000 kWh/day within their respective energy consumption value ranges. In some embodiments, the server device 101 may perform a key range query on a bucket index such as the bucket index 500 of FIG. 5A to retrieve all buckets which contain at least one non-spatial attribute value which is less than 400 kWh/day and all buckets which contain at least one non-spatial attribute value which is greater than 10,000 kWh/day.

At block 712, a subset of map feature fragments which are assigned the selected buckets may be retrieved from the map feature fragments corresponding to the requested geographic region and level of detail using one or more key ranges spanning the selected buckets. Then at block 714, a post-filtering step is performed to filter out map feature fragments having non-spatial attribute values outside of the requested set but which are assigned the selected buckets. Using the same example, a map feature fragment may be included in the retrieved subset of map feature fragments which has an energy consumption value of 450 kWh/day and is assigned to bucket 300 kWh/day that ranges from 300 kWh/day to 500 kWh/day. Because 450 kWh/day is outside of the requested set of less than 400 kWh/day, the attribute filtering module 148 may filter out this map feature fragment from the retrieved subset of map feature fragments. The retrieved subset of map feature fragments, after the post-filtering step, may then be provided to the client device 102 (block 716).

Using the systems and procedures described above, the system 100 for efficiently indexing geospatial data can retrieve and analyze data from a computing device that indicates a geographic location. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 600 and 700 may include one or more function blocks, modules, individual functions or routines in the form of tangible computer-executable instructions that are stored in a non-transitory computer-readable storage medium and executed using a processor of a computing device (e.g., a server, a personal computer, a smart phone, a tablet computer, a head mounted display, a smart watch, a mobile computing device, or other personal computing device, as described herein). The methods 600 and 700 may be included as part of any backend server 101 or client computing device 102 modules of a computing environment for a system 100 for efficiently indexing geospatial data, for example, or as part of a module that is external to such a system. For example, the methods may be part of a geospatial data indexing module 140, an attribute filtering module 148, etc. executing within an application on a computing device of a system 100 for efficiently indexing geospatial data. Though the figures may be described with reference to the other figures for ease of explanation, the methods 600 and 700 can be utilized with other objects and user interfaces. Furthermore, although the explanation above describes steps of the methods 600 and 700 being performed by specific devices (such as a client computing device 102 and a server 101), this is done for illustration purposes only. The blocks of the methods 600 and 700 may be performed by one or more devices or other parts of the system 100, such as the client computing device 102 and/or server 101.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, as indicated above, at least some of the operations may be performed by a group of computers (as examples of machines including processors), these operations being accessible via a network (e.g., the Internet) and via one or more appropriate interfaces (e.g., application programming interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict some embodiments of the system 100 for efficiently indexing geospatial data for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the system 100 for efficiently indexing geospatial data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for performing live filtering of geospatial data, the method comprising:
    for a plurality of map feature fragments each having a non-spatial attribute, wherein the non-spatial attribute is at least one of: weather data, demographic data, energy consumption data, real-estate value data, or department store price data, and a corresponding non-spatial attribute value, and representing at least a portion of a map feature which represents a geographic entity:
    generating, by one or more processors, a plurality of buckets, each bucket representing a range of the corresponding non-spatial attribute values for the map feature fragments;
    assigning, by the one or more processors, a bucket from the plurality of buckets to each of the plurality of map feature fragments based on the corresponding non-spatial attribute value for the respective map feature fragment;
    upon receiving a request from a client device for map data for a particular geographic region having a non-spatial attribute value within a requested set of non-spatial attribute values:
    selecting, by the one or more processors, one or more of the plurality of buckets which correspond to the requested set of non-spatial attribute values,
    retrieving, by the one or more processors, one or more of the map feature fragments which are assigned the selected one or more buckets and correspond to the requested geographic region, and
    providing, by the one or more processors, the one or more retrieved map feature fragments to the client device.

2. The method of claim 1, wherein generating the plurality of buckets comprises:
    generating, by the one or more processors, a distribution of the non-spatial attribute values for the at least some map feature fragments; and
    determining, by the one or more processors, one or more evenly distributed portions of the distribution wherein each portion corresponds to a bucket of the plurality of buckets.

3. The method of claim 2, wherein determining one or more evenly distributed portions of the distribution comprises determining, by the one or more processors, a plurality of quantiles based on the distribution of the non-spatial attributes, and assigning a bucket to each respective quantile.

4. The method of claim 1, further comprising filtering out, by the one or more processors, each of the retrieved map feature fragments which are assigned the selected one or more buckets and include a non-spatial attribute value outside of the requested set of non-spatial attribute values.

5. The method of claim 1, wherein the range of the non-spatial attribute values is a continuous range.

6. The method of claim 1, wherein selecting one or more of the plurality of buckets which correspond to the requested set of non-spatial attribute values comprises for each of the plurality of buckets, determining, by the one or more processors, whether any of the non-spatial attribute values within the range of non-spatial attribute values for the respective bucket are within the requested set of non-spatial attribute values.

7. The method of claim 1, wherein each of the plurality of map feature fragments corresponds to a range of levels of detail (LOD), at least two map feature fragments of the plurality of map feature fragments correspond to a same map feature within a geographic region at a particular LOD, and the at least two map feature fragments have different ranges of LODs.

8. A computing device comprising:
    a communication interface;
    one or more processors coupled to the communication interface; and
    a non-transitory computer-readable medium storing thereon instructions that, when executed by the one or more processors, cause the computing device to:
    for a plurality of map feature fragments each having a non-spatial attribute, wherein the non-spatial attribute is at least one of: weather data, demographic data, energy consumption data, real-estate value data, or department store price data, and a corresponding non-spatial attribute value, and representing at least a portion of a map feature which represents a geographic entity:

generate a plurality of buckets, each bucket representing a range of the corresponding non-spatial attribute values for the map feature fragments;

assign a bucket from the plurality of buckets to each of the plurality of map feature fragments based on the corresponding non-spatial attribute value for the respective map feature fragment;

upon receiving a request from a client device for map data for a particular geographic region having a non-spatial attribute value within a requested set of non-spatial attribute values:

select one or more of the plurality of buckets which correspond to the requested set of non-spatial attribute values, retrieve one or more of the map feature fragments which are assigned the selected one or more buckets and correspond to the requested geographic region, and provide the one or more retrieved map feature fragments to the client device.

9. The computing device of claim 8, wherein to generate the plurality of buckets, the instructions cause the computing device to:

generate a distribution of the non-spatial attribute values for the at least some map feature fragments; and determine one or more evenly distributed portions of the distribution wherein each portion corresponds to a bucket of the plurality of buckets.

10. The computing device of claim 9, wherein to determine one or more evenly distributed portions of the distribution, the instructions cause the computing device to determine a plurality of quantiles based on the distribution of the non-spatial attributes, and assign a bucket to each respective quantile.

11. The computing device of claim 8, wherein the instructions further cause the computing device to filter out each of the retrieved map feature fragments which are assigned the selected one or more buckets and include a non-spatial attribute value outside of the requested set of non-spatial attribute values.

12. The computing device of claim 8, wherein the range of the non-spatial attribute values is a continuous range.

13. The computing device of claim 8, wherein to select one or more of the plurality of buckets which correspond to the requested set of non-spatial attribute values, for each of the plurality of buckets, the instructions cause the computing device to determine whether any of the non-spatial attribute values within the range of non-spatial attribute values for the respective bucket are within the requested set of non-spatial attribute values.

14. The computing device of claim 8, wherein each of the plurality of map feature fragments corresponds to a range of levels of detail (LOD), at least two map feature fragments of the plurality of map feature fragments correspond to a same map feature within a geographic region at a particular LOD, and the at least two map feature fragments have different ranges of LODs.

15. A method for displaying geospatial data according to non-spatial attributes, the method comprising:

providing, by one or more processors, a request for map data for a particular geographic region having a non-spatial attribute value within a requested set of non-spatial attribute values wherein a non-spatial attribute corresponding to the non-spatial attribute value is at least one of:

weather data, demographic data, energy consumption data, real-estate value data, or department store price data;

receiving, by the one or more processors, one or more map feature fragments having corresponding non-spatial attribute values within the requested set of non-spatial attribute values and representing at least portions of map features which represent geographic entities within the requested geographic region, wherein a plurality of map feature fragments are assigned buckets each bucket representing a range of the corresponding non-spatial attribute values for the map feature fragments, and the one or more map feature fragments are selected from the plurality of map feature fragments which correspond to the requested geographic region and which are assigned one or more of the buckets which correspond to the requested set of non-spatial attribute values; and presenting, by the one or more processors, the one or more map feature fragments.

16. The method of claim 15, wherein the buckets are assigned by generating a distribution of the non-spatial attribute values for the at least some map feature fragments, and determining one or more evenly distributed portions of the distribution wherein each portion corresponds to one of the buckets.

17. The method of claim 16, wherein determining one or more evenly distributed portions of the distribution comprises determining a plurality of quantiles based on the distribution of the non-spatial attributes, and assigning a bucket to each respective quantile.

18. The method of claim 15, wherein each of the retrieved map feature fragments are filtered out which are assigned the selected one or more buckets and include a non-spatial attribute value outside of the requested set of non-spatial attribute values.

19. The method of claim 15, wherein the one or more map feature fragments represent housing and the requested set of non-spatial attribute values is a range of housing prices.

20. The method of claim 15, wherein each of the one or more map feature fragments corresponds to a range of levels of detail (LOD), at least two map feature fragments of the map feature fragments correspond to a same map feature within a geographic region at a particular LOD, and the at least two map feature fragments have different ranges of LODs.

* * * * *